(12) United States Patent
Beghelli

(10) Patent No.: US 10,389,171 B2
(45) Date of Patent: Aug. 20, 2019

(54) EMERGENCY POWER SUPPLY FOR LIGHTING APPARATUS

(71) Applicant: BEGHELLI S.P.A., Valsamoggia (IT)

(72) Inventor: Gian Pietro Beghelli, Valsamoggia (IT)

(73) Assignee: BEGHELLI S.P.A., Bologna (IT)

( * ) Notice: Subject to any disclaimer, the term of this patent is extended or adjusted under 35 U.S.C. 154(b) by 0 days.

(21) Appl. No.: 15/775,913

(22) PCT Filed: Oct. 31, 2016

(86) PCT No.: PCT/IB2016/056552
§ 371 (c)(1),
(2) Date: May 14, 2018

(87) PCT Pub. No.: WO2017/081576
PCT Pub. Date: May 18, 2017

(65) Prior Publication Data
US 2018/0331567 A1 Nov. 15, 2018

(30) Foreign Application Priority Data
Nov. 13, 2015 (IT) .......................... 102015000072371

(51) Int. Cl.
*H05B 41/14* (2006.01)
*H02J 9/06* (2006.01)
(Continued)

(52) U.S. Cl.
CPC .............. *H02J 9/061* (2013.01); *H02J 9/065* (2013.01); *H02M 3/33523* (2013.01); *H05B 33/0815* (2013.01); *Y02B 20/346* (2013.01)

(58) Field of Classification Search
None
See application file for complete search history.

(56) References Cited

U.S. PATENT DOCUMENTS

| 2010/0213857 A1* | 8/2010 | Fan | H05B 33/0815 315/186 |
| 2014/0312699 A1* | 10/2014 | Wang | H05B 33/0815 307/66 |
| 2015/0214785 A1* | 7/2015 | Jagjitpati | H05B 33/0815 307/66 |

FOREIGN PATENT DOCUMENTS

WO 2007/121799 11/2007

OTHER PUBLICATIONS

Wu et al., "A Three-in-One Converter for Regular and Emergency Lighting Application", IEEE Transactions on Industry Applications, vol. 45, No. 1, Jan. 1, 2009, pp. 108-115.
(Continued)

*Primary Examiner* — Anh Q Tran
(74) *Attorney, Agent, or Firm* — Nixon & Vanderhye P.C.

(57) ABSTRACT

An emergency power supply for lighting apparatuses and to a lighting apparatus for an emergency power supply. The emergency power supply (1) includes: a power supply (11) provided with at least one main insulation, e.g., transformer, (34), operatively connectable to the network voltage; an accumulator (16) operatively connected to the power supply (11); a flyback power converter (17) including a primary (18) and a secondary (19) provided within at least one additional insulation, e.g., transformer (30). The primary (18) is connected to the accumulator (16) and the secondary (19) is directly connectable, except for the conversion network, to the output of a network power supply (2) and simultaneously to a light source (3). A control unit (20), which includes an transistor activation device (27), is operatively connected to the power supply (11), to the accumulator (16) and to the primary (18) of the flyback power converter (17) and is configured for detecting the network voltage and for switching the emergency power supply (1) between a first mode of deactivation of the flyback power
(Continued)

converter (17) and a second mode of activation of the flyback power converter (17).

19 Claims, 3 Drawing Sheets

(51) Int. Cl.
*H05B 33/08* (2006.01)
*H02M 3/335* (2006.01)

(56) References Cited

OTHER PUBLICATIONS

International Search Report for PCT/IB2016/056552 dated Jan. 26, 2017, 5 pages.
Written Opinion of the ISA for PCT/IB2016/056552 dated Jan. 26, 2017, 6 pages.
International Preliminary Report on Patentability for PCT/IB2016/056552 dated Jan. 31, 2018, 25 pages.

* cited by examiner

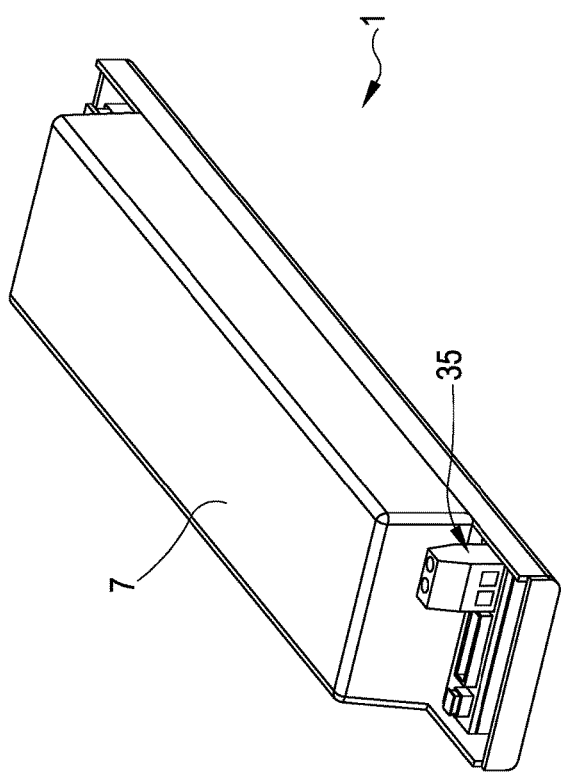
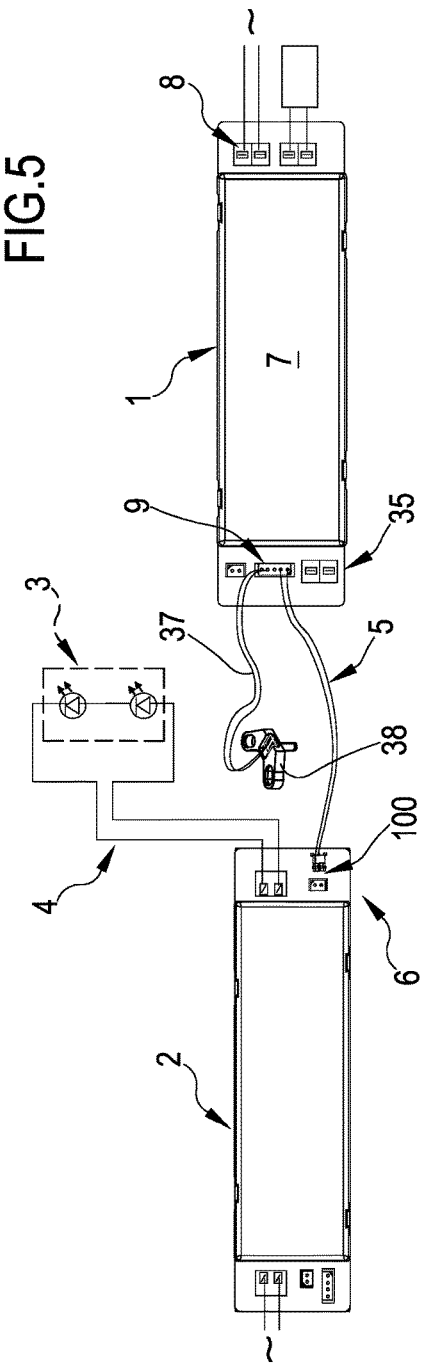
FIG.4
FIG.5

EMERGENCY POWER SUPPLY FOR LIGHTING APPARATUS

RELATED APPLICATION

This application is the U.S. National Phase of PCT/IB2016/056552 filed Oct. 31, 2016, and which designated the U.S. and claims priority to Italian Patent Application 102015000072371 filed Nov. 13, 2015, the entire contents of both are incorporated by reference.

FIELD OF THE FINDING

The object of the present invention is an emergency power supply for lighting apparatuses. In particular, the present invention refers to emergency power supplies intended to assist and be operatively associated with the ordinary network power supplies, in order to operate the light source in emergency mode. Preferably but not exclusively, the present invention refers to emergency power supplies intended to be combined with lighting apparatuses after their production (conversion kits) in order to transform the lighting apparatus into an emergency lighting apparatus. Preferably but not exclusively, the present invention refers to emergency power supplies for light sources supplied with direct parameters (e.g. DC direct current). Preferably but not exclusively, the present invention refers to emergency power supplies for light sources of LED type.

BACKGROUND OF THE INVENTION

Emergency power supplies for light sources adapted to transform a lighting apparatus into an emergency lighting apparatus are known. Two main cases thereof can be identified.

The emergency inverter type, constituted by a device integrating or not integrating a safety source interposed between the power supply grid and the network power supply, so to be able to power supply it from safety source and ensure the operation thereof even in the absence of the power supply grid.

The second case, related to the present description, is known as a Converter Kit and is generally associated with ordinary power supplies that are however independent therefrom, i.e. capable of turning on and supplying the light source by means of an incorporated power supply thereof capable of coordinating the operation thereof with that of the network power supply by means of a suitably designed interface section. When there is no the network voltage, the converter kit supplies the light source by drawing energy from the rechargeable battery (safety source).

For example, the public document US 2014/0312699 illustrates a backup power supply with constant power for apparatuses of LED type which comprises a battery that is loaded while an AC alternating current source is activated. A switch-provided circuit switches between the AC power supply and the emergency supply by moving contacts onto different positions. When there is no AC source, a group of capacitors charged by the battery supplies current to the primary of a flyback converter that operates in discontinuous manner. The secondary of the flyback converter supplies constant power to the LED.

The public document EP 2 011 211 illustrates an emergency lighting device for providing illumination to a light source such as a LED. The device comprises a battery and a recharge circuit supplied with the network voltage and provided with a flyback converter. The flyback converter is configured for recharging the battery. The device also comprises a control circuit supplied during emergency operation by the battery and in capable of managing the power supply of the LED.

SUMMARY

In such context, the Applicant has perceived the need to improve the known emergency power supplies with particular reference to the performances thereof, in terms of efficiency, reliability and to the installation mode of the same on pre-existing apparatuses.

The Applicant has in fact observed that the interface section integrated in the emergency power supplies of known type usually executes the switching of the ordinary power supply during emergency, between the grid (source) and its own battery, by means of switches/relay which are physically moved between one contact and the next (see for example the known document US 2014/0312699). Such switches/relay, generally incorporated in the emergency power supply, must be physically interposed between the network power supply and the light source and this requires altering the original wiring, cutting/disconnecting the cables and executing new connections in the emergency power supply. In addition to considerable intervention times/costs, these relatively complex operations can lead to connection errors, with consequent damaging of the apparatus. In addition, apparatuses thus modified, originally in accordance with general requirements pertaining to the electrical safety and to general construction rules, might no long be compliant; in any case, they may require further, expensive tests in order to verify the maintenance of the minimum safety requirements ensured by the original product.

Regarding the interface systems based on automatic contacts (relays), the Applicant has observed that the exchange contacts of the relays are subjected to electrical stresses that shorten the lifetime of the contacts themselves. Such stress is due to the switching of non-zero currents in the presence of parasitic inductances. In addition, in the presence of interface elements based on the mechanical switching of contacts, the downstream circuits (the light source, in the current case) are subjected to extra currents that are even higher if lacking suitable attenuation circuits. This in particular occurs at the time of the passage from emergency operation (without grid) to ordinary operation (with grid). In order to remedy such functioning, the main known techniques are based on the introduction of delays and/or additional contacts (on the power supply of the network power supply) so as to coordinate the operation of the network power supply with the operation of the emergency power supply. However, this involves a certain delay between the moment without the grid and the turning on of the light sources from a battery.

The solution found by the Applicant overcomes these problems by obtaining an interface based on the coupling between the circuits achieved with transformer provided with suitable insulation and output protection circuit.

The Applicant has also observed that the power supplies of known type do not allow ensuring the stability of the operation thereof, in particular with regard to the transferred output power, if not through the insertion in the output section of circuitry parts for the direct measurements on the load (the light source) or on the accumulator, thus establishing a feedback control; this affects the performances of the power supply and of the system in general, since the direct measurements involve loss of efficiency.

The system proposed by the Applicant detects a measurement (peak current) and estimates the power absorbed thereof by only referring to design parameters of the circuit. Measurements which make any reference to entities relative to the applied load are not executed. In this manner there is improved behavior both in terms of stability and regarding energy, since it is based on known quantities (not least the energy available from the battery) while the load can have unknown parameters. The Applicant has also observed that the power supplies of known type are complex and employ solutions (like relays) such to dissipate non-negligible quantities of energy (relatively high consumptions). The dissipation of energy produces heat that can negatively affect the performances of the power supplies themselves (for example in terms of operating lifetime of the battery/batteries that they contain).

In such context, the Applicant therefore set the following objectives:
- realize an emergency power supply for lighting apparatuses which provides improved performances, in particular but not exclusively an improved efficiency of transfer of the energy from the safety source to the load (light performances), e.g. in terms of efficiency by reducing the power losses on the circuits;
- realize an emergency power supply for lighting apparatuses that is relatively simple and reliable, in particular eliminating the physically moving parts, primary cause of system unreliability;
- realize an emergency power supply for lighting apparatuses which is easily installable on pre-existing apparatuses in a manner so as to increase the safety of the modified apparatus, to decrease the costs of installation and to facilitate the intervention of the installer;
- realize an emergency power supply for lighting apparatuses that can, due to a coordinate insulation system, be used in all contexts without affecting the level of protection against electrical shock of the original product.

The Applicant has found that the above-indicated objectives and still others can be attained by equipping the ordinary power supply interface section—for the emergency power supply of the light source—with a flyback power converter that incorporates a transformer with at least one additional insulation, so as to eliminate switches/switching relays, consequently increasing the reliability and safety of operation of the device and of the entire system associated therewith. In particular, the flyback power converter works discontinuously and has a primary connected, by means of a self-regulation and switching circuit, to an accumulator/battery and a secondary which power supplies the light source. The flyback power converter is activated, by the control unit, if the detected network voltage falls below a predefined threshold.

In particular, in one aspect, the objects indicated and still others are substantially attained by an emergency power supply for lighting apparatuses, comprising:
a power supply operatively connectable to the network voltage and provided with at least one main insulation;
an accumulator (e.g. a battery) operatively connected to the power supply;
a flyback power converter comprising a primary having an electronic switch and a secondary, in which the primary is connected to the accumulator and the secondary, provided with at least one additional insulation, is electrically and directly connected to cables (4) placed between a network power supply (2) and a light source (3) of a lighting apparatus, due to the main insulation (34) and to the additional insulation (30);
a control unit, operatively connected to the power supply, to the accumulator and to the primary of the flyback power converter and configured for detecting the network voltage and for switching the emergency power supply between a first mode in which the flyback power converter is deactivated and a second mode in which the flyback power converter is activated (emergency phase);
wherein in the second mode (emergency phase), the flyback power converter works discontinuously at the switching frequency of the electronic switch;
wherein the control unit comprises an activation device configured to activate the flyback power converter, i.e. to bring it into the second mode.

With the term "directly" referred to the direct connection between the secondary and the light source, it is intended that there is no presence of switches/relay.

In other words, an interface device is present between the flyback power converter and the network power supply which is suitable to directly transfer, to the output circuit, the energy produced by the flyback converter without the use of switches/relay.

In addition, also the activation device configured to activate the flyback power converter is not provided with switches/relay. Indeed, in the emergency circuits, it is opportune that there are no switches/relay interposed between batteries and oscillating output circuit.

In another aspect, the present invention relates to a lighting apparatus, comprising:
a network power supply;
a light source connected to the network power supply;
an emergency power supply according to one or more of the aspects described herein and/or one or more of the enclosed claims;
wherein the secondary of the flyback power converter of the emergency power supply is electrically and directly connectable or connected to cables that connect the network power supply to the light source.

In a further aspect, the present invention relates to a method for converting a lighting apparatus into an emergency lighting apparatus, comprising:
providing a lighting apparatus comprising a network power supply and a light source connected to the network power supply;
providing an emergency power supply according to one or more of the aspects described herein and/or one or more of the enclosed claims;
connecting, directly in parallel, the terminals of the secondary of the flyback power converter of the emergency power supply to the cables which are extended between the network power supply and the light source.

The Applicant has verified that the use of the flyback power converter associated with a suitable transformer allows an insulated power conversion that substitutes the conventional relay solution and simultaneously allows connecting the emergency power supply between the network power supply of the original apparatus and the light source without having to use relative complex operations for modifying the original wiring. Indeed, the secondary of the flyback power converter can be connected, by means of a simple shunt or a suitable connector, to the cables which lead from the network power supply to the light source. This allows the emergency power supply to simply support the network power supply without compromising the safety. In addition, the simplicity of the connection allows using less wiring with respect to the prior art, with further savings in terms of times and costs of installation.

The flyback power converter, when the emergency power supply is situated in the second mode (emergency phase), brings energy "quantities/packets" with constant switching frequency, from the accumulator/battery to the load/light source. The power is therefore converted into constant electrical parameters and sent with open loop (i.e. without requiring feedback) to said light source. The present solution allows having a circuit which delivers a constant power to the load (light source) independent of its functional variations.

The Applicant has also verified that, since the emergency power supply according to the present invention does not have any switching relay (which in the prior art is turned on during the presence of the network voltage or when it is supplied by the battery), there is no energy dissipated on the coil of the relay (on the order of hundreds of milliwatt). Therefore, more energy is available for supplying the load/light source. The reduction of dissipated energy also leads to the reduction of the work temperature and limits the heating of the battery. This allows increasing the useful lifetime of the battery (given the same nominal performances and cost thereof) or using less expensive batteries (maintaining the operating lifetime thereof unchanged with respect to more expensive batteries). In addition, it allows using the device in environments characterized by temperatures greater than those in which it could have been used with the other conditions being the same. Indeed, the lower heating of the battery—the critical element of emergency systems—allows using the device in an environment with an operating temperature slightly higher than what could have been if the device had used a relay coordination system (due to coil heating).

In one aspect according to one or more of the preceding aspects, said main insulation is at least equivalent to additional insulation as in table 10.2—EN60598-1:2015 (V=2 U+1000V).

In one aspect according to one or more of the preceding aspects, said additional insulation is at least equivalent to additional insulation as in table 10.2—EN60598-1:2015 (V=2 U+1000V).

In one aspect according to one or more of the preceding aspects, said main insulation and said additional insulation are characterized by the same test values. In one aspect according to one or more of the preceding aspects, the interface device comprises an output diode and/or a capacitor operatively connected to the secondary of the flyback power converter and connectable by means of a wiring to the light source and to the network power supply.

In one aspect according to one or more of the preceding aspects, the power supply and the network power supply are AC supplied and the light source is DC supplied. In one aspect according to one or more of the preceding aspects, the light source is supplied with electrical power comprised between about 10 and 100 Watt from grid and about 1 and 30 Watt during emergency.

In one aspect according to one or more of the preceding aspects, the light source is supplied with direct parameters (DC) also from the network power supply. Preferably, the light source is of LED (light emitting diode) type. The present invention can also be employed for halogen light sources or even incandescent light sources or loads operating in the field of nominal operating parameters.

In one aspect according to one or more of the preceding aspects, the activation device comprises at least one transistor. The transistor is used as a switch adapted for activating or deactivating the flyback power converter by controlling the electrical conductivity of the transistor itself, and hence the electric current which crosses it, by means of the application of a voltage between its terminals.

In one aspect according to the preceding aspect, the transistor switches when the network voltage exceeds a predefined threshold.

In one aspect according to the preceding two aspects, the control unit comprises a voltage detector operatively coupled to a secondary of the power supply and to the transistor, in order to bring to said transistor a signal proportional to the network voltage.

In one aspect according to one or more of the preceding aspects, a DC/DC controller is operatively interposed between the control unit and the switch of the flyback power converter.

In one aspect according to one or more of the preceding aspects, the switch of the flyback power converter is a MOSFET.

In one aspect according to the preceding aspect, a driver of the switch of the primary of the flyback power converter is operatively interposed between the DC/DC controller and said switch, in order to obtain an improved drive front.

In one aspect according to one or more of the preceding aspects, a detection device of the peak current in the primary of the flyback power converter serves to detect and adjust the power sent to the light source.

In one aspect according to the preceding aspect, a detection device is a microcontroller or a suitable comparison circuit.

In one aspect according to the two preceding aspects, said detection device is operatively active on the primary of the flyback power converter and is operatively connected to the DC/DC controller.

One advantage of the flyback converter is that of being able to have information on the power transferred by means of only one electrical parameter (the peak current), while in conventional mode, to know the power it is necessary to multiply the voltage and current values transferred to the load.

The detection device determines the absorbed power in an indirect manner (without measuring it at the output) and sends it onto the load (light source). The estimation of such power is made by measuring the current peak I, and the power P sent to the load is given by $P=\frac{1}{2} L I^2 f \eta$ with: f switching frequency, $\eta$ efficiency, L inductance of the primary of the converter.

The application of this principle allows turning on the light source, with constant power, independent of its nature and its variables, without having to introduce feedback elements.

In one aspect according to one or more of the preceding aspects, an additional capacitor is placed between the primary and one of the terminals of the output wires. The additional capacitor is configured in order to ensure at least one additional insulation and reduce the conducted emission problems present, having the two electrical domains "shared" (secondary of the flyback and network power supply output of the original apparatus).

In one aspect according to one or more of the preceding aspects, the emergency power supply comprises a preferential (emergency) output connector connected to the secondary of the flyback power converter.

In one aspect according to the preceding aspect, a complementary connector is inserted between the network power supply and the light source in order to be coupled to the preferential emergency connector directly or by means of suitable wiring.

In one aspect according to one or more of the preceding aspects, the emergency power supply comprises a further auxiliary (emergency) output connector connected to the secondary of the flyback power converter. Such auxiliary output connector is available for the connection to conventional systems not predisposed for the direct connection between the network power supply and the device requested.

In one aspect according to one or more of the preceding aspects, the emergency power supply comprises a box-like casing containing the network power supply, a battery charger, the accumulator, the control unit, the flyback power converter and the interface device.

In one aspect according to the preceding aspect, the box-like casing externally has a network connector, or network terminals, connected to the power supply and configured for being connected to the power grid.

In one aspect according to the preceding aspect, the box-like casing externally has a network connector, or network terminals, connected to the power supply and configured for transferring possible remote control commands to the power supply. In one aspect according to the preceding aspect, the box-like casing externally has emergency connector(s).

Further characteristics and advantages will be clearer from the detailed description of a preferred but not exclusive embodiment of a lighting apparatus provided with an emergency power supply according to the present invention.

DESCRIPTION OF THE DRAWINGS

Such description will be set forth hereinbelow with reference to the enclosed drawings, provided only as a non-limiting example, in which:

FIGS. 3 and 4 illustrate respective perspective views of the emergency power supply of FIG. 1;

FIG. 5 illustrates an embodiment of the lighting apparatus provided with the emergency power supply.

DETAILED DESCRIPTION

With reference to the above mentioned figures, reference number 1 overall indicates an emergency power supply according to the present invention.

Figure 1:
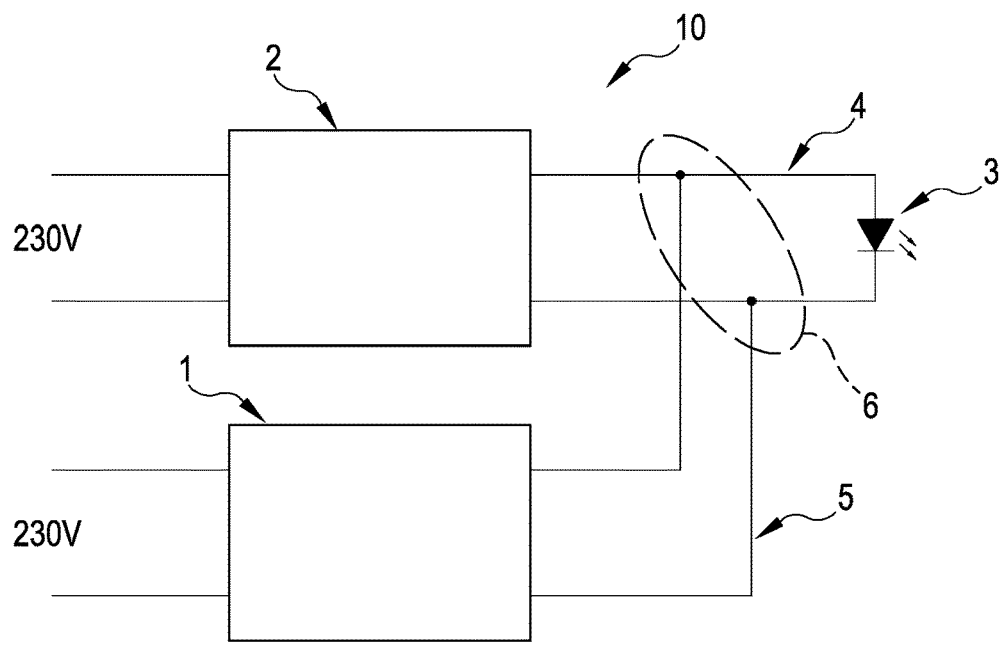
FIG. 1 schematically illustrates a lighting apparatus provided with an emergency power supply according to the present invention.

In FIG. 1, the emergency power supply 1 is combined with a lighting apparatus of conventional type comprising a network power supply 2 connectable to the power grid. The network power supply 2 is per se known and comprises an AC/DC converter. It is supplied with AC alternating current and feeds a light source 3, with which it is connected, with DC direct current. The light source 3 illustrated in the enclosed figures in a schematic manner is a LED module. Said light source 3 is connected by means of cables 4 (wiring) to the output terminals, not shown, of the network power supply 2. The emergency power supply 1 is connected, by means of suitable wiring in connection zone 6, to the cables 4 interposed between the network power supply 2 and the light source 3. The emergency power supply 1 is also connectable to the power grid.

Figure 3:
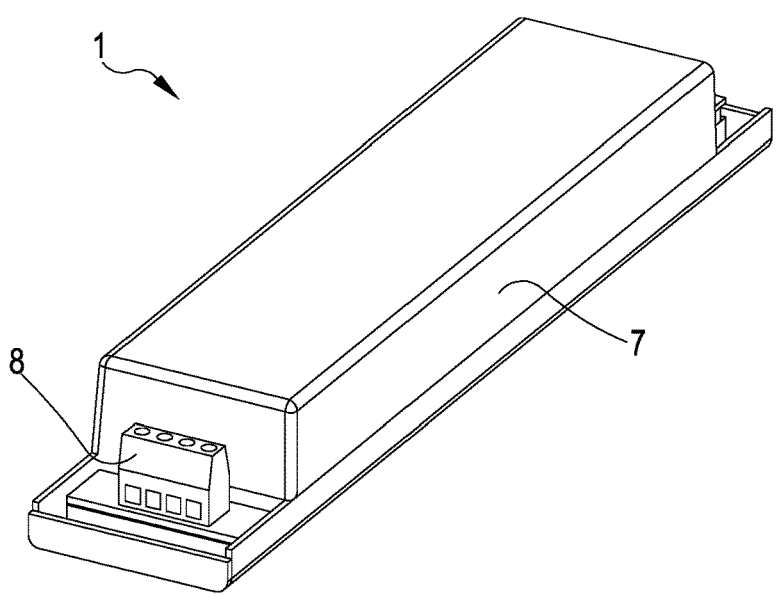

FIGS. 3 and 4 illustrate a box-like casing 7 of the emergency power supply 1 having a terminal board 8 for the connection to the power grid and to possible control elements. Also depicted in FIG. 5 is the wiring 5 exiting from the box-like casing 7 and terminating with a preferential (emergency) output connector 9 and an auxiliary emergency connector 35. In the embodiment illustrated in FIG. 5, a further additional wiring connects it to a signaling LED. Such preferential (emergency) output connector 9 is configured for being directly and safely coupled to a complementary connector 100 connected to the cables 4 at the connection zone 6, i.e. operatively arranged between the network power supply 2 and the light source 3. Such connectors 9, 100 are made so they can be easily coupled and uncoupled in a manual manner and preferably without the use of specific tools.

The set of the network power supply 2 with the light source 3 and the emergency power supply 1 form a lighting apparatus 10 configured for operating as emergency lighting apparatus.

Figure 2:
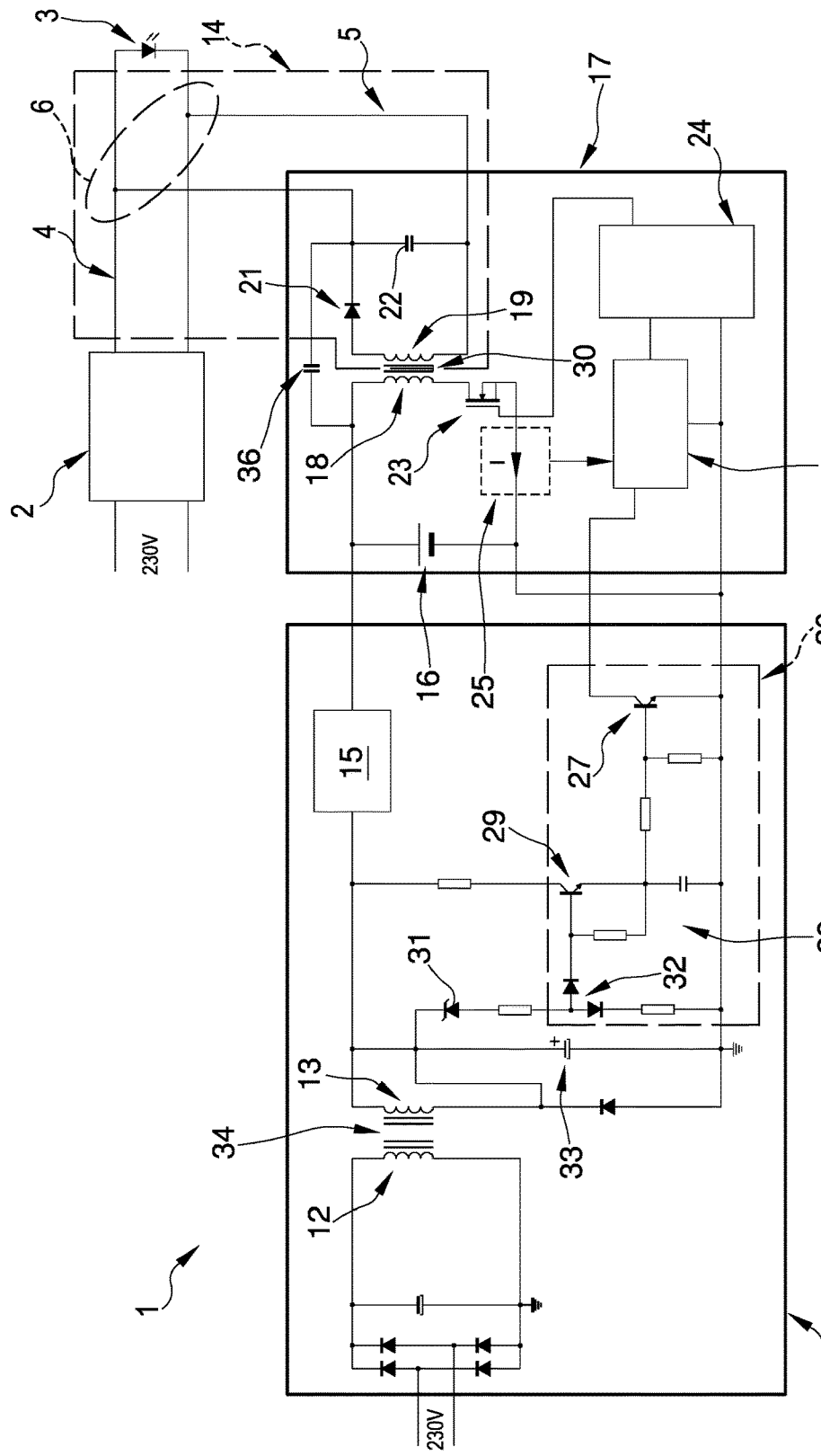
FIG. 2 illustrates in detail the diagram of the emergency power supply combined with the lighting apparatus.

With reference to FIG. 2, the emergency power supply 1 comprises a power supply 11 operatively connectable to the network voltage (e.g. 230 V) by means of the aforesaid terminal board 8. The power supply 11 is of AC/DC type and comprises a transformer with a primary 12, power supplied directly from the network voltage, and a secondary 13 connected to a battery charger 15. FIG. 2 illustrates diodes and a capacitor arranged in parallel with the primary 12. The circuit section connected downstream of the primary circuit is insulated therefrom with at least one main insulation 34 (insulation pursuant to the techniques of protection against electrical shock as in table 10.2 EN60598-1:2015 (V=2 U+1000V)).

An accumulator 16, in battery form, is connected to the battery charger 15 and to the power supply 11.

The emergency power supply 1 comprises a flyback power converter 17 (whose diagram is per se known). The flyback (recovery) converter 17 has switching power supply with galvanic isolation 30 between input and output equal to at least one additional insulation (insulation pursuant to the techniques of protection against electric shock as in table 10.2 EN60598-1:2015 (V=2 U+1000V)). The flyback power converter 17 comprises two coupled inductors. A primary 18 of the flyback power converter 17 is connected to the battery 16. A secondary 19 of the same flyback power converter 17, by means of the section composed of an output diode 21 and a capacitor 22, is connectable in parallel to the light source 3 by means of the wiring 5 and the connector 9.

The output diode 21, the capacitor 22, the wiring 5 and the possible preferential emergency connector 9 are part of an interface device 14 at the network power supply 2 which is suitable to directly transfer, to the output circuit, the energy produced by the flyback converter 17 without the use of switches/relay.

The emergency power supply 1 also comprises a control unit 20 operatively connected to the power supply 11, to the battery 16 and to the primary 18 of the flyback power converter 17.

The control unit 20 carries out the function of switching the emergency power supply 1 between a first mode and a second mode (emergency phase).

In the first mode, when the network voltage supplies the power supply 11, the flyback power converter 17 is deactivated. The light source 3 is continuously supplied (or can be supplied) through the network power supply 2. The power supply 11 of the emergency power supply 1 provides to charge the battery 16 by means of the battery charger 15.

In the second (emergency) mode, when there is no network voltage, the flyback power converter 17 is activated by means of the control unit 20. In the second mode, the flyback power converter 17 provides over time to transfer the energy of the battery 16 to the light source 3. For example, the light source 3 is supplied with an electric power ranging from 1 to 30 Watt.

More in detail, the flyback power converter 17 comprises the above mentioned output diode 21 and the capacitor 22 placed in series with the inductor of the secondary 19. The capacitor 22 is placed in parallel to the light source 3. The diode 21 and capacitor 22 assembly achieves the direct output current. In addition, the diode 21 achieves the protection of the system from the direct current coming from the network power supply 2 when this is turned on. A switch 23 is placed in series with the inductor of the primary 18 of the flyback power converter 17 and, when the flyback power converter 17 is activated or in the second mode, it opens and closes with a switching frequency "f". In said second mode, the flyback power converter 17 works discontinuously with the switching frequency "f" of the switch 23 and brings energy "quantities" with said switching frequency "f" from the accumulator/battery 16 to the load/light source 3. The power is therefore converted and sent with open chain, i.e. without requiring control feedback, to the LED module 3.

In the illustrated example, the switch 23 of the flyback power converter 17 is a MOSFET. The MOSFET switch 23 is driven by a driver 24 (which can comprise two transistors and a resistor).

A detection device 25 of the peak current in the primary 18 of the flyback power converter 17 (e.g. a microcontroller and a suitable comparison circuit) is operatively active on said primary 18 and serves to detect said peak current "I". A signal relative to the above mentioned peak current "I" is sent to a DC/DC controller 26 operatively interposed between the control unit 20 and the driver 24 of the MOSFET switch 23 in a manner so as to adjust the power sent from the accumulator 16 to the light source 3 when the flyback power converter 17 is activated. The detection device 25 in this manner determines the absorbed power "P" indirectly, and sends it to the light source 3. The estimation of such power "P", except for the efficiency, is given by detecting the current peak "I" and the power "P" sent to the load is given by:

$$P = \frac{1}{2} L I^2 f \eta$$

with:
I peak current,
f switching frequency,
$\eta$ efficiency,
L inductance.

In this manner, the circuit turns on the light source without feedback.

In the embodiment illustrated in FIG. 2, the flyback power converter 17 also comprises an additional capacitor 36, of suitable value and insulation as in table 10.2 EN60598-1: 2015 (V=2 U+1000V), placed between the primary 18 and the secondary 19 whose function is that of reducing the conducted emission problems present, since the two electrical domains (secondary of the flyback 17 and network power supply output 2 of the original apparatus) are shared.

The control unit 20 comprises an activation device 27 intended to activate the flyback power converter 17 and a voltage detector 28. The voltage detector 28 is operatively connected to the secondary 13 of the power supply 11 and to the activation device 27, in order to bring, to said activation device 27, a fraction of the voltage at the secondary 13 of the power supply 11. The activation device 27 also carries out the function of comparator. If the voltage reported at the comparator 27 falls below a predefined threshold (e.g. 0.6 Volt), the activation device 27 activates the flyback power converter 17.

In the illustrated embodiment, the comparator and activation device 27 is a transistor used as a switch, turned on when the network voltage exceeds a predefined threshold. The transistor 27 is used as a switch adapted to activate or deactivate the flyback power converter 17 by controlling the electrical conductivity of the transistor 27 itself by means of the application of a voltage between its terminals. The voltage detector 28 comprises a further transistor 29 and a capacitor. The circuit also has expedients for preventing thermic drift; for this reason, the Zener diode 31, the double diode 32 and the suitable resistive dividers are inserted.

In other words, the control unit 20 is also comparator which detects the network voltage and activates the DC/DC controller 26 if the network voltage falls below or exceeds a certain threshold.

With reference to FIG. 2, the power supply 11 of the emergency power supply 1 has a capacitor 33 placed in parallel with the secondary 13.

The transistor 27 is turned on when the network voltage exceeds a certain level.

On the cathode of the Zener diode 31, the fixed output voltage (of the electrolytic capacitor 33) is added with the peak of the network voltage reported at the secondary 13. This sum is divided and actively detected by the transistor 29 and reported at the input of transistor 27 which carries out the function of comparator with activation threshold at about 0.6V.

Ignoring the drop Vbe of the transistor 29, if Vz=Vout (on the capacitor 33), at the input of the comparator 27 there is a voltage equal to Vin*K1 where:
Where Ns is the number of secondary turns 13
Where Np is the number of primary turns 12
Once a suitable value of Kp is selected, one obtains the switching to the desired network voltage Vin.

The conversion of the ordinary apparatus into an emergency apparatus is thus very simple. It will in fact suffice to provide the above-described emergency power supply and connect the preferential (emergency) output connector 9 to the complementary connector 100.

LIST OF ELEMENTS 1 emergency power supply
2 network power supply
3 light source/LED
4 cables interposed between network power supply and light source
5 wiring
6 connection zone
7 box-like casing
8 terminal board
9 preferential emergency connector
10 emergency lighting apparatus
11 power supply section of the emergency power supply 1
12 primary power supply
13 secondary power supply
14 interface device
15 battery charger
16 accumulator/battery
17 flyback power converter
18 primary of the flyback power converter
19 secondary of the flyback power converter
20 control unit
21 diode of the flyback -continued

| | |
|---|---|
| 22 | capacitor of the flyback |
| 23 | switch of the flyback |
| 24 | driver of the switch |
| 25 | detection device of the peak current |
| 26 | DC/DC controller |
| 27 | transistor (activation device) |
| 28 | voltage detector |
| 29 | transistor of the voltage detector |
| 30 | additional insulation |
| 31 | Zener diode |
| 32 | double diode |
| 33 | capacitor |
| 34 | main insulation |
| 35 | auxiliary emergency connector |
| 36 | additional capacitor |
| 37 | additional wiring |
| 38 | signaling LED |

The invention claimed is:

1. An emergency power supply apparatus for lighting apparatuses comprising:
a power supply operatively connectable to a network voltage and including at least one main insulation;
an accumulator operatively connected to the power supply;
a flyback power converter including a primary having an electronic switch and a secondary, wherein the primary is connected to the accumulator and the secondary, provided within at least one additional insulation, is electrically and directly connected to cables between a network power supply and a light source of a lighting apparatus, due to the main insulation and to the additional insulation;
wherein said flyback power converter is configured to directly transfer to an output circuit energy without switches/relay;
a control unit operatively connected to the power supply, to the accumulator and to the primary of the flyback power converter and the control unit is configured to detect the network voltage and to switch the emergency power supply between a first mode of deactivation of the flyback power converter and a second mode of activation of the flyback power converter,
wherein in the second mode, the flyback power converter works discontinuously at the switching frequency (f) of the electronic switch;
wherein the control unit comprises an activation device configured to activate the flyback power converter; and
wherein the activation device includes at least one transistor which switches the flyback power converter from the second mode to the first mode in response to the network voltage exceeding a predefined threshold.

2. The emergency power supply according to claim 1, further comprising an output diode operatively connected to the secondary of the flyback power converter and connectable by a wiring to the light source and to the network power supply.

3. The emergency power supply according to claim 1, comprising a capacitor operatively connected to the secondary of the flyback power converter and connectable by a wiring to the light source and to the network power supply.

4. The emergency power supply according to claim 3, wherein the capacitor is placed in parallel to the light source.

5. The emergency power supply according to claim 3, wherein an output diode and the capacitor are placed in series with an inductor of the secondary.

6. The emergency power supply according to claim 1, wherein the secondary of the flyback power converter is connectable by a shunt or a connector to the cables which lead from the network power supply to the light source.

7. The emergency power supply according to claim 1, wherein the control unit comprises a voltage detector operatively coupled to a secondary of the power supply and to the transistor, in order to bring to said transistor a signal proportional to the network voltage.

8. The emergency power supply according to claim 1, comprising a DC/DC controller operatively interposed between the control unit and the electronic switch of the flyback power converter.

9. The emergency power supply according to claim 8, further comprising a driver of the electronic switch of the primary of the flyback power converter, wherein said driver is operatively interposed between the DC/DC controller and said switch.

10. The emergency power supply according to claim 8, further comprising a detection device configured to detect a peak current (I) in the primary of the flyback power converter, wherein said detection device is operatively active on the primary of the flyback power converter and is operatively connected to the DC/DC controller to detect and adjust the power (P) sent to the light source.

11. The emergency power supply according to claim 1, comprising a capacitor placed between the primary and one of the terminals of output wires and configured for ensuring at least one additional insulation.

12. A lighting apparatus comprising:
the network power supply;
wherein the light source is connected to the network power supply through the cables;
the emergency power supply according to claim 1;
wherein the secondary of the flyback power converter of the emergency power supply is electrically and directly connectable or connected to the cables that connect the network power supply to the light source.

13. The lighting apparatus according to claim 12, wherein the emergency power supply comprises a preferential output connector connected to the secondary of the flyback power converter and connectable to a complementary connector present on the cables between the network power supply and the light source.

14. The lighting apparatus according to claim 13, wherein the emergency power supply comprises an auxiliary output connector connected in parallel to the preferential output connector.

15. A method to provide a lighting apparatus with an emergency power supply, the method comprising:
providing a lighting apparatus comprising a network power supply and a light source connected to the network power supply;
providing an emergency power supply comprising:
a power supply operatively connectable to the network voltage and isolated from the network voltage by at least one main transformer;
an accumulator operatively connected to the power supply;
a flyback power converter comprising a primary having a transformer and an electronic switch, wherein the transformer includes a primary connected to the accumulator and a secondary;
wherein said flyback power converter is configured to directly transfer to the light source electrical energy from the accumulator without a switch or a relay;

a control unit operatively connected to the power supply, to the accumulator and to the primary of the flyback power converter and the control unit is configured to detect the network voltage and, in response to the detected network voltage, switch the emergency power supply between a first mode of deactivation of the flyback power converter and a second mode of activation of the flyback power converter, wherein in the second mode, the flyback power converter operates at a switching frequency (f) of the electronic switch;

wherein the control unit comprises an activation device configured to activate the flyback power converter, and the activation device includes at least one transistor which switches the flyback converter from the second mode to the first mode in response to the network voltage exceeding a predefined threshold; and said method further comprising connecting, directly in parallel, the terminals of the secondary of the flyback power converter of the emergency power supply to cables which are extended between the network power supply and the light source.

16. The emergency power supply apparatus of claim 1 wherein the at least one main insulation includes a transformer and the at least one additional insulation includes a transformer.

17. An emergency power supply apparatus comprising:
an emergency power supply including a first transformer having a primary winding configured to be connected to a network voltage source and a secondary winding;
a battery connected to the secondary winding of the first transformer such that power from the network voltage source is applied to charge the battery;
a flyback power converter including a second transformer having a primary winding connected to both the battery and the secondary winding of the first transformer and a secondary winding configured to be connected to a power input cable of a lighting source, wherein the power input cable is also configured to be connected directly to the network voltage source, and the connection between the secondary winding of the flyback power converter and the power input cable is without a switch or relay; and
a controller configured to respond to a loss of power from the network voltage source by repeatedly switching on and off a connection between the battery and the primary winding of the second transformer.

18. The emergency power supply apparatus of claim 17 wherein the controller includes a driver configured to switch the connection at a switching frequency.

19. The emergency power supply apparatus of claim 17 further comprising a switch in series between the battery and the primary winding of the second transformer, wherein the controller is configured to actuate the switch to perform the repeated switching on and off of the connection.

* * * * *